US009122943B1

(12) United States Patent
Muszynski et al.

(10) Patent No.: US 9,122,943 B1
(45) Date of Patent: Sep. 1, 2015

(54) IDENTIFYING RENDERING DIFFERENCES BETWEEN LABEL RENDERING ENGINES

(71) Applicant: Amazon Technologies, Inc., Reno, NV (US)

(72) Inventors: Richard John Muszynski, Snohomish, WA (US); Scott Robert Parish, North Bend, WA (US); Clayton Matthew Magouyrk, Seattle, WA (US); Samir Bhayyaji Khobragade, Bothell, WA (US); Michael Christopher Wenneman, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 44 days.

(21) Appl. No.: 13/929,679

(22) Filed: Jun. 27, 2013

(51) Int. Cl.
*G06K 9/00* (2006.01)
*G06K 9/34* (2006.01)
*G09G 5/00* (2006.01)
*G06K 9/18* (2006.01)

(52) U.S. Cl.
CPC ........................................ *G06K 9/18* (2013.01)

(58) Field of Classification Search
CPC ....... G06K 9/18; G06K 9/036; G06K 9/3258; G06K 9/6211; G06K 2209/01; G06T 17/05; G06T 19/00; G01C 21/3638
USPC ......... 382/112, 181, 182, 183, 184, 185, 190, 382/195, 198, 162, 163, 164, 165, 166, 167, 382/173, 174, 175, 176, 177, 178, 179, 291, 382/292; 345/629, 418, 581, 582, 587, 501, 345/552, 419, 506, 502, 586, 584, 619; 455/410, 556.1, 414.1, 466, 12.1, 13.2; 715/700, 705, 714, 708; 707/709; 250/559.04
See application file for complete search history.

(56) References Cited

U.S. PATENT DOCUMENTS

| 5,659,672 | A  | * | 8/1997  | Yutaka et al. ................. 345/582 |
| 7,890,136 | B1 | * | 2/2011  | Fujisaki ..................... 455/556.1 |
| 8,090,402 | B1 | * | 1/2012  | Fujisaki ..................... 455/556.1 |
| 8,150,458 | B1 | * | 4/2012  | Fujisaki ..................... 455/556.1 |
| 8,175,338 | B2 | * | 5/2012  | Ma ................................. 382/112 |
| 8,244,043 | B2 | * | 8/2012  | Chang et al. .................. 382/218 |
| 8,311,578 | B1 | * | 11/2012 | Fujisaki ..................... 455/556.1 |
| 8,379,027 | B2 | * | 2/2013  | Lim et al. ...................... 345/467 |
| 8,805,089 | B2 | * | 8/2014  | Chang et al. .................. 382/218 |
| 2013/0076784 | A1 | * | 3/2013 | Maurer et al. ................ 345/629 |

\* cited by examiner

*Primary Examiner* — Sheela Chawan
(74) *Attorney, Agent, or Firm* — Novak Druce Connolly Bove + Quigg LLP

(57) ABSTRACT

Various embodiments provide a method for randomly selecting a region on a map for testing and a map of the region can be generated using multiple map rendering engines. A screenshot of each of the generated maps can be obtained and text associated with map labels, such as street, city, and attraction names, can be recognized using an optical character recognition (OCR) engine. At this point, the recognized text from each rendering engine can then be compared to identify at least one error or inconsistency. In at least one embodiment, categories of errors that need most attention in the specific geographic areas can be identified and a human quality assurance tester can isolate these instances and narrow down the same to identify the rendering or data problem.

20 Claims, 5 Drawing Sheets

IDENTIFYING RENDERING DIFFERENCES BETWEEN LABEL RENDERING ENGINES

BACKGROUND

Many people utilize computer-based mapping applications to obtain various types of information for a location. For example, users often rely on these the computer-based mapping applications to provide them with directions to a location, locate places near a current or specific location, or search for businesses or points of interest. Label rendering engines are responsible for rendering the labels associated with this information on the map. These labels can include street names, airport names, park names, zip codes, highways, city names, and the like. The label rendering engines are optimized to avoid collisions between labels, reduce busyness or clutter, and display appropriate labels for a particularly displayed geometry, such as a point for a coffee shop, polygon for a park and the like. The quality of the label rendering depends at least in part on the underlying data and collision algorithms. The label data or the associated geometry is updated regularly to reflect changes in the real world entities, such as businesses or points of interest, such as if a coffee shop moves from one address to another, or if a park or street is renamed, a new building is built, a city block is rezoned, and the like. These data changes or changes in the rendering algorithms can reflect poorly on the perceived quality of the mapping application product by the consumer if they are not adequately or properly presented to the same, such as if a user drives to a now closed coffee shop or seeing corn field labeled as an airport. Traditionally these data changes are manually validated for quality. While this is effective for identifying obvious errors, it is quite difficult to manually visit every single location in the world maps at each magnification or zoom level to verify that each rendering engine has properly rendered each label and map feature as these maps are constantly being changed.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to providing accurate mapping data and related information. In particular, various approaches automatically analyze one or more regions of a map, or similar type of content, at various zoom levels and rotation angles with at two different map rendering engines in order to identify rendering errors or inconsistencies, in order to assure a level of map quality and/or accuracy.

For example, a region can be randomly selected by an algorithm for testing and a map of the region can be generated using multiple map rendering engines. A screenshot, or other collection of data, of each of the generated maps can be obtained and text associated with map labels, such as street, city, and attraction names, can be recognized using an optical character recognition (OCR) engine or algorithm. At this point, the recognized text from each rendering engine can then be compared to identify at least one error or inconsistency. In at least one embodiment, categories of errors that need most attention in the specific geographic areas can be identified and a human quality assurance tester can isolate these instances and narrow down the same to identify the rendering or data problem.

Various other functions and advantages are described and suggested below as may be provided in accordance with the various embodiments.

Figure 1:
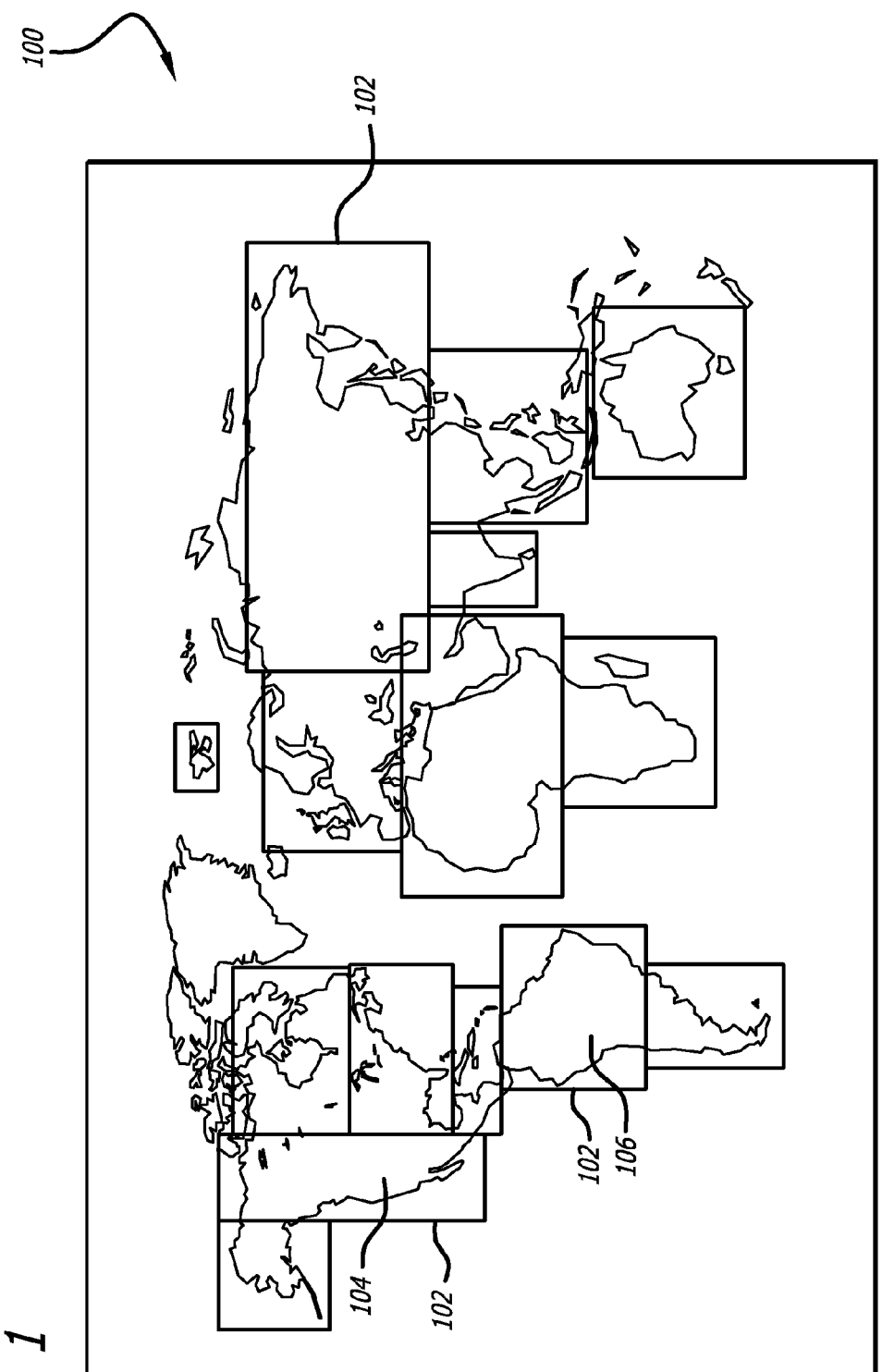
FIG. 1 illustrates an example world map broken up into rectangles in accordance with at least one embodiment.

FIG. 1 shows an example screenshot of map 100 of the world that is broken up into regions at a particular magnification or zoom level for map 100 in accordance with at least one embodiment. In this example, a label rendering engine would be responsible for rendering the labels associated with the information on map 100. Rendering is the process of generating an image from a computer program model and a label rendering engine is a software component that creates a graphical representation of the model which, in this example, a map. Since map 100 is of the whole world, it may likely represent the highest level of magnification and, as a result, would likely provide the least level of detail in the form of label information. For example, a map of the would likely include the names of countries, major cities, oceans, and possibly major mountain ranges, rivers, lakes, and the like. In this example, each region of map 100 is represented by rectangles 102. The label rendering engines are optimized to avoid collisions of these labels, reduce busyness or clutter, and display appropriate labels for a particularly displayed spatial arrangement. Therefore, less detailed information will be provided at higher magnification levels.

Figure 2:
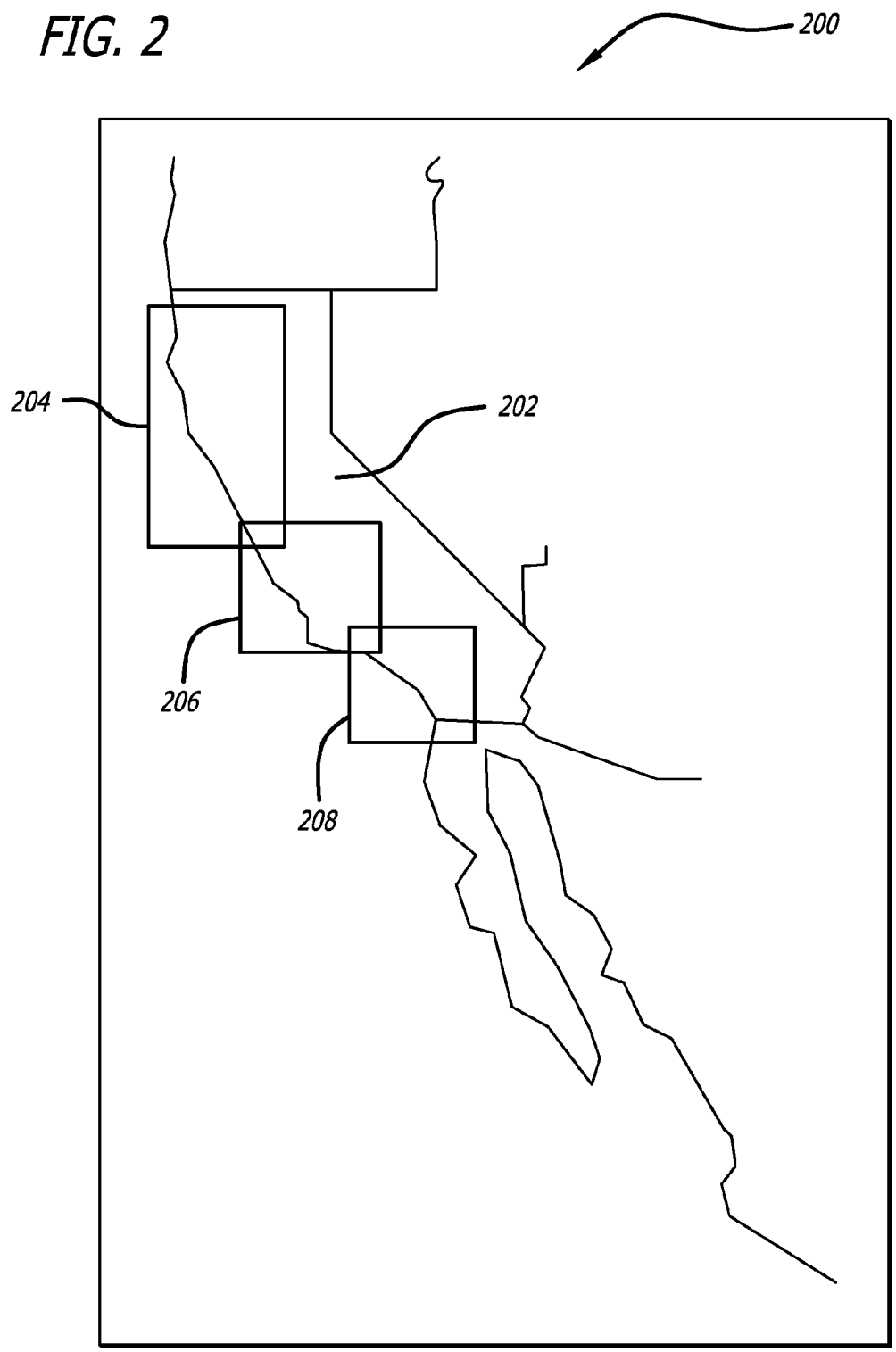
FIG. 2 illustrates an example regional map broken up into rectangles in accordance with at least one embodiment.

FIG. 2 shows another example screenshot of map 200 of the state of California 202 in accordance with at least one embodiment. In this example, map 200 has also been broken up into regions (204, 206, 208) at a lower magnification level relative to map 100 and, thereby, would display more map details relative to map 100. In this example, the label rendering engines would be responsible for rendering the labels associated with more regional information for the state of California 202, such as the names of major cities, counties, parks, mountain ranges, rivers, lakes, highways, and the like. Therefore, at a lower magnification level, more detailed map information is able to be displayed to users. Information at lower magnification levels, however, tends to be more likely to change more frequently relative to map information at higher magnification levels, as shown in FIG. 1. Accordingly, label data and associated geometry or spatial arrangement data must be updated regularly to reflect changes in real world map entities, such as new businesses or points of interest being opened or existing businesses or points of interest being closed. These data changes or changes in the rendering algorithms can reflect poorly on the perceived quality of the mapping application if they are not properly presented to consumers by the label rendering engines, such as if a user drives to a now closed coffee shop or observes a park labeled as an airport. Traditionally these data changes are manually validated for quality. Accordingly, an automatic method for identifying a quality delta between rendering engines providing these labels (and other mapping data) to users may at least be more efficient at identifying errors than manually validating the same.

In at least one embodiment, a number of regions in the world are identified for testing by the rendering engines. For example, the region or regions could be selected from a list of rectangles that have segmented accordingly to various attributes such as magnification level, country, native language, continent, area, and the like. Accordingly, each rectangle is represented using four values including, for example, Rectangle [i].xMin, Rectangle [i].yMin, Rectangle [i].xMax, and Rectangle [i].yMax. The longitude and latitude coordinates fitting the rectangle could be randomly generated where the longitude=Random(Rectangle [i].xMin, Rectangle [i].xMax) and the latitude=Random(Rectangle [i].yMin, Rectangle [i].yMax) at a magnification level (between 1 to 23 where level 1 is a world level while level 23 a street level etc.), which can be identified as a length of a quad tree index key.

Figure 3A:
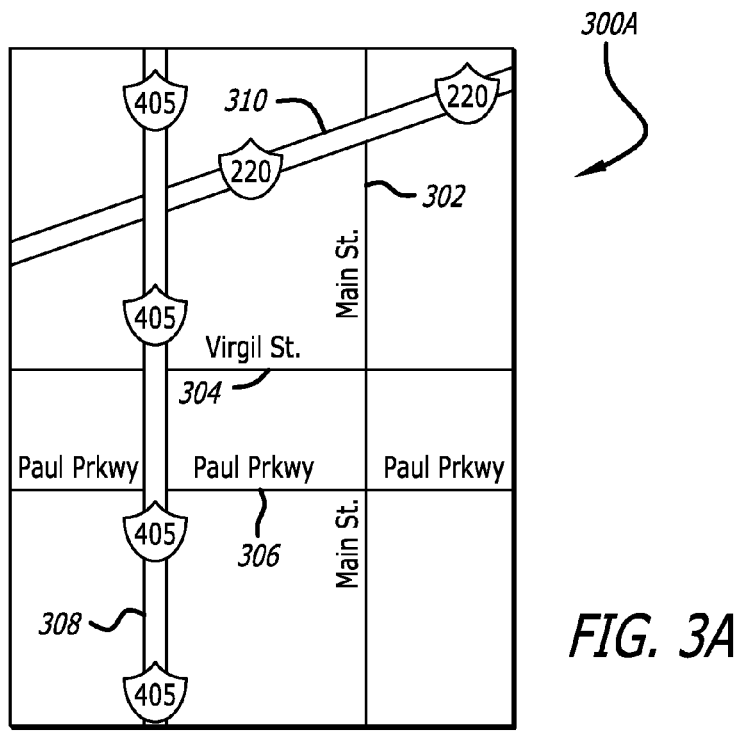
FIGS. 3A and 3B illustrate example screenshots of a map each rendered with a different rendering engine in accordance with at least one embodiment.
Figure 3B:
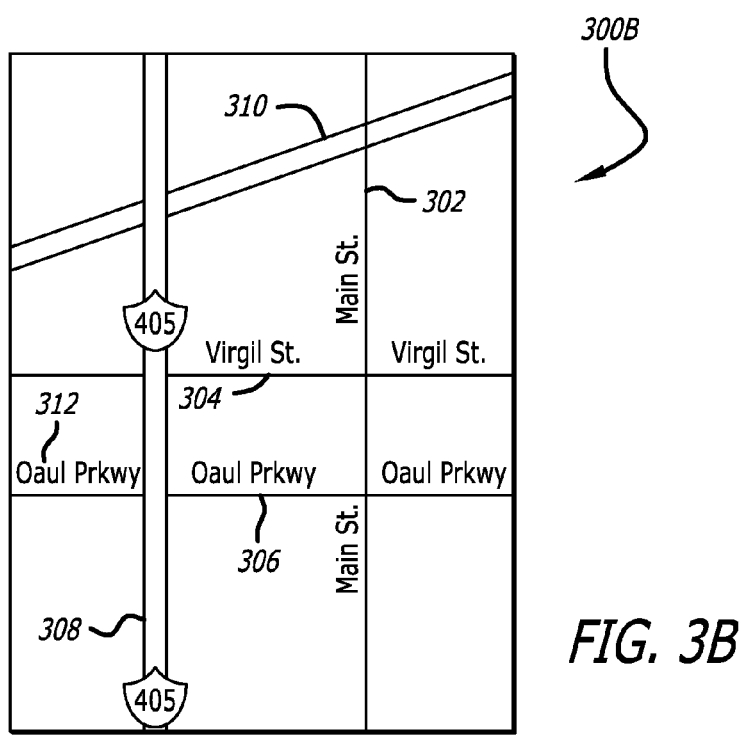

Accordingly, in one example, two label rendering engines render a map for the region defined by the rectangle. For example, RenderingEngine1.render (longitude, latitude, zoomLevel) and RenderingEngine2.render (longitude, latitude, zoomLevel). FIGS. 3A-3B illustrate example map renderings 300A and 300B, respectfully, that were rendered with a different label rendering engine, in accordance with at least one embodiment. In this example, each of map renderings 300A and 300B represent the same rectangle rendered by two different rendering engines at an even lower magnification level, relative to FIGS. 1-2, and are, therefore, responsible for rendering map labels associated with greater detailed mapping information for the rectangle. Accordingly, screenshots of map renderings 300A and 300B could be, for example a raster representation or image screenshot, among other such techniques. The mapping information, in this example, includes such information as the names of streets, highways, and the like. In this example, map renderings 300A and 300B could also include information for businesses or points of interest or this information could be provided in an even lower magnification level.

After map renderings 300A and 300B are obtained, an optical character recognition (OCR) algorithm is run to extract text from labels rendered on screenshots of map renderings 300A and 300B. In this example, the OCR algorithm can account for the label rotation that have been adapted to fit to or along a curving street. The OCR output for each screenshot may include a format of labels as rendered on the map for each respective rendering engine along with the number of times that each label appears therein. In this example, FIG. 3A includes Main St. 302 appearing twice, Virgil St. 304 appearing once, Paul Prkwy 306 appearing three times, 405 freeway 308 appearing four times, and 220 freeway 310 appearing twice. Accordingly, FIG. 3B includes Main St. 302 appearing twice, Virgil St. 304 appearing twice instead of once, Paul Prkwy 306 which is misspelled as Oaul Prkwy 312 appearing three times, 405 freeway 308 appearing twice instead of four times, and 220 freeway 310 is not labeled at all. In this example, an algorithm in accordance with various embodiments can determine that the labels generated using the two different rendering engines have two notable differences: Paul Parkway 306 is labeled as Oaul Parkway 312 and 220 Freeway 310 is now missing from the map. Accordingly, an appropriate severity of errors or inconsistencies for one or both of map renderings 300A and 300B and an automated error report for human tester can be generated to fix what could have been a data entry error, for example.

In at least one embodiment, a category of the errors or inconsistencies that needs the most attention can be automatically identified and isolate for a human tester to verify, remedy these instances, and/or narrow down the same to a particular rendering or data problem. Accordingly, a set of possible or known errors and inconsistencies can be categorized or assigned varying levels of severity. In one example, the levels of severity can be associated with a numerical weighting where higher priority errors are weighted higher relative to less important errors or inconsistencies. Then, upon identifying an inconsistency between rendering engines, the identified inconsistency can be compared (using, for example, pattern recognition) to the set possible or known errors and inconsistencies to determine the level of severity for the identified inconsistency. Accordingly, if the determined severity is greater than a threshold value (associated with the weighting), the identified inconsistency can be categorized and flagged for human observation, verification, and/or remedying. For example, Oaul Parkway 312 and the missing label for 220 Freeway 310 in FIG. 3B may be flagged as an error or inconsistency having a severity high enough to be flagged for human observation and remedying (i.e., inconsistent spellings of corresponding labels between rendering engines or missing labels could be associated with a relatively high weighting). Conversely, the fact that Virgil St. 304 appears twice instead of once and 405 freeway 308 appears twice instead of four times in map rendering 300B may not be flagged as important enough for human observation and remedying (i.e., inconsistent label counts or quantities could be weighted relatively low).

In at least one embodiment, in order to increase recognition accuracy of the OCR algorithm, known textual data for the rectangle of map renderings 300A and 300B, which is derived from data uses initially to render map renderings 300A and 300B, can be used as an input to seed or inform the OCR algorithm. By seeding the OCR algorithm with words, letters, ideograms known to or should exist in the region for map renderings 300A and 300B, the OCR algorithm may be able to recognize text with a higher accuracy. When comparing the map renderings 300A and 300B, detection of labels can be split into multiple recognition passes. For example, each recognition pass can focus on one language or character set. In one example, in a region where both Cantonese and English labels are provided, one OCR pass for Cantonese, and one OCR pass for English can be performed. Accordingly, performing multiple passes may allow for finer grained problem detection. Further, when generating map renderings to compare, random values for rotation and pitch can also be included in order to verify the validity of the renderings across from different angles and pitches.

In at least one embodiment, when detecting categories of errors or inconsistencies, the type of labeling difference can be taken into account. For example, differences in label cardinality, such as when one rendering engine has one street labeled once and another rendering engine has the same street labeled twice, will be categorized differently than differences of label location. In at least one embodiment, error correction between labels (to account for spelling errors, for example) can be performed using an edit distance between similar words. Accordingly, these errors can be categorized differently than the missing or incorrect labels, as discussed above.

The map labels, and their associated text, will often contain color variations to set them apart from their background, such as special edge highlighting and the like. In some instances, this can make detecting overlapping map labels or overlapping text difficult since the top character or map label may be set apart from a label or character beneath the same just enough to be recognized by the OCR engine. This is, however, unacceptable since overlapping or smashed labels can be quite a severe cosmetic, as well as practical, problem. Accordingly, in at least one embodiment, label overlap detection can be performed. In one example, each or at least one of the maps can be rendered with labels having a simplified color scheme. For example, the OCR algorithm may be able to detect malformed, unrecognizable, or irregular characters due to letters being partially overlapped, completely overlapping, or have insufficient spacing, such as layout collusion issues. More particularly, the name of a road or street could be improperly bent as the road or street turns, curves, or bends or the name of a cul-de-sac can be improperly smash or rendered on top of itself. Further, some actual map labels may actually overlap and block or obscure at least a portion of another map label. Accordingly, a color scheme of the map labels can be adjusted to substantially blur edges of overlapping text by removing edge highlighting or any other technique used to make text or a label stand out from its background. The result of any overlapping text then, in a simplified color scheme, is an irregular, unrecognizable text-sized or text-like character. The location in the region of such an irregular character can be stored and classified as a potential collision for human eyes to verify. Further, instead of adjusting the color scheme, the map label text can be converted to plain text or plain font that is uniformly black in color.

In at least one embodiment, some labels may span multiple lines and, in order to adequately compare these labels, the map labels associated with each rendering engine can be normalized to a single line to determine whether a particular label appears in both map renderings. Accordingly, upon identifying a map label that spans more than one line of text, the map label in each representation can be normalized, or expanded to a single line of text in order to adequately compare the corresponding map labels to determine if the map label appears in each representation. Further, in this example, the location where each rendering breaks the label into multiple lines can be compared, which enables the detection of differences in line wrapping and text justification, and the like for each rendering. As used herein, line wrapping refers to the feature of continuing on a new line when a line is full, such that each line fits in the viewable window, to allow text to be read from top to bottom without any horizontal scrolling and text justification refers to the alignment or range, is the setting of text flow or image placement relative to a page, or location on map rendering.

Figure 4:
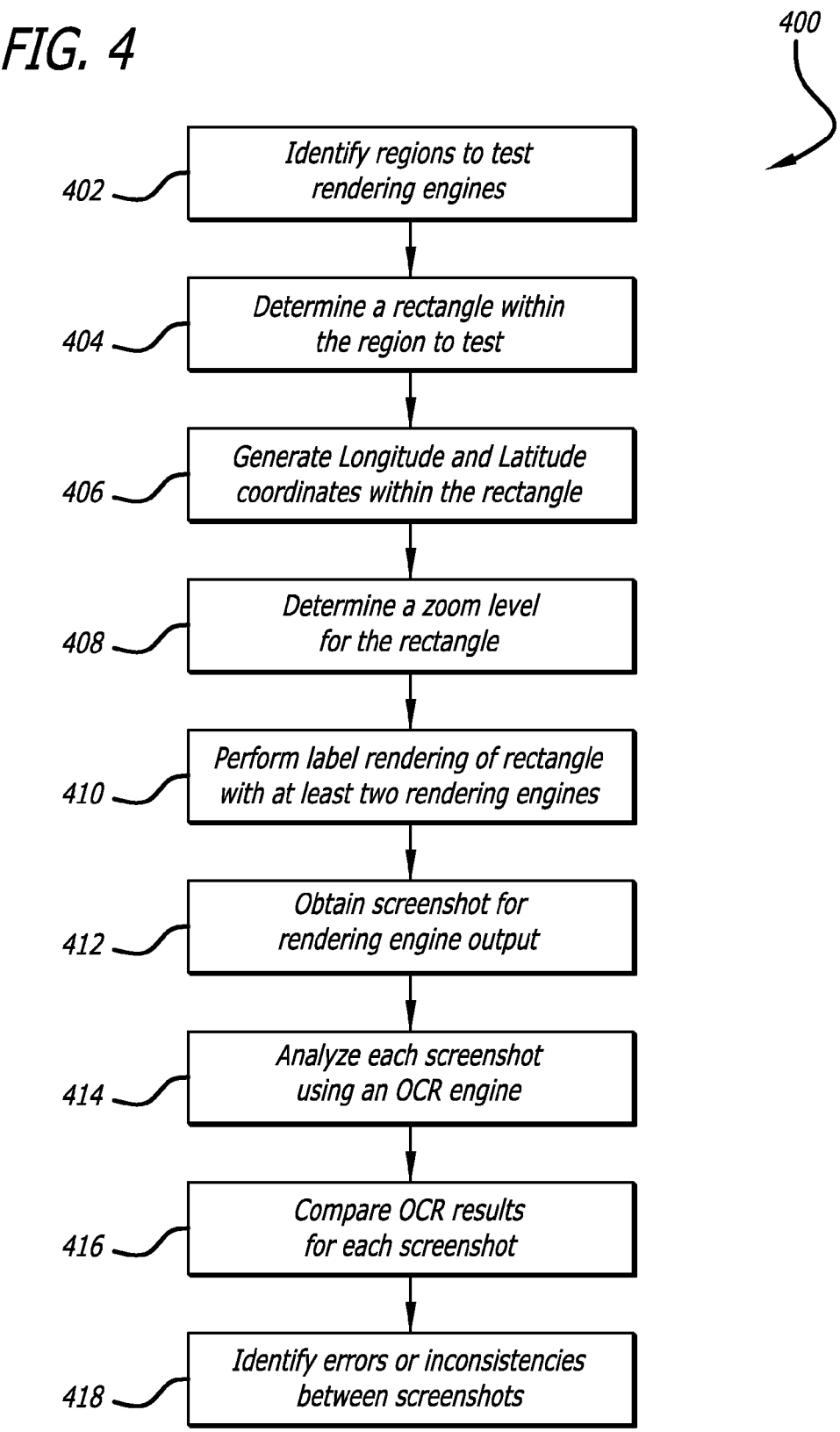
FIG. 4 illustrates an example process for identifying a quality delta between rendering engines that can be used in accordance with at least one embodiment.

FIG. 4 illustrates an example process 400 for identifying a quality delta between rendering engines that can be used in accordance with various embodiments. It should be understood that, for this and other processes discussed herein, there can be additional, fewer, or alternative steps, performed in similar or alternative steps, or in parallel, within the scope of the various embodiments unless otherwise stated.

In this example, at least one region to test each of a number (e.g., two or more) of rendering engines is identified 402. In this example, a rectangle within the region for testing is determined 404, although other shapes or groupings can be utilized as well within the scope of the various embodiments. In this example, longitude and latitude coordinates that fit the rectangle are generated 406. A magnification level for the rectangle is also determined 408. In at least one embodiment, an algorithm could systematically process or analyze all regions of the world at each magnification level. In at least one embodiment, certain regions can be prioritized over other regions or the choice of a region to analyze could be random. For example, more populated urban areas or cities could be prioritized over less dense or uninhabited regions, such as deserts. Further, these prioritized regions could be analyzed more frequently. For example, the map labels of a densely populated city with change more often than a less dense region with fewer businesses.

In this example, labels of a map associated with the rectangle at the determined magnification level are rendered. The rendering of the labels, in this example, are performed by at least two rendering engines 410. Screenshots for the output of each rendering engine is obtained 412. Each screenshot, in this example, is analyzed using an OCR engine 414. The results from the OCR engine for each screenshot are then compared 416. Accordingly, errors or inconsistencies are identified by comparing the OCR results of the screenshots 418. The errors or inconsistencies can be categorized and the categories of errors needing the most attention in a specific geographic area can be identified and a human quality assurance tester can isolate these instances and narrow down the same to identify the rendering or data problem. Various other methods can be utilized and provided as well within the scope of the various embodiments.

As discussed herein, optical character recognition (OCR) is the mechanical or electronic conversion of scanned images of handwritten, typewritten, or printed text into machine-encoded text. Accordingly, OCR is a common method of digitizing printed texts so that they can be electronically searched, stored more compactly, displayed on-line, and used in machine processes such as machine translation, text-to-speech, text mining, and map rendering label comparison, as discussed herein.

Figure 5:
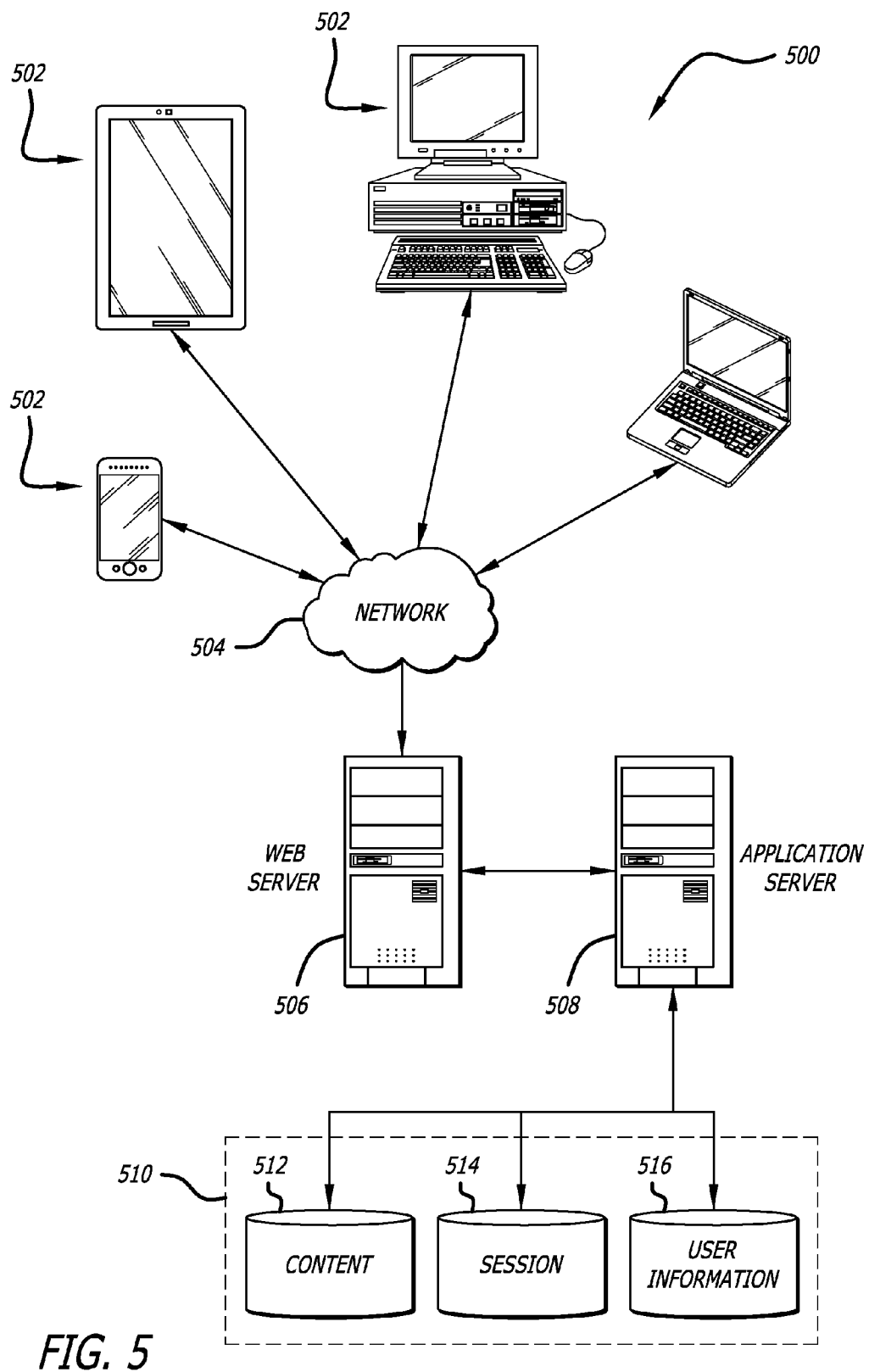
FIG. 5 illustrates an environment in which various embodiments can be implemented.

Different approaches can be implemented in various environments in accordance with the described embodiments. For example, FIG. 5 illustrates an example of an environment 500 for implementing aspects in accordance with various embodiments. As will be appreciated, although a Web-based environment is used for purposes of explanation, different environments may be used, as appropriate, to implement various embodiments. The system includes an electronic client device 502, which can include any appropriate device operable to send and receive requests, messages or information over an appropriate network 504 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 506 for receiving requests and serving content in response thereto, although for other networks, an alternative device serving a similar purpose could be used, as would be apparent to one of ordinary skill in the art.

The illustrative environment includes at least one application server 508 and a data store 510. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 508 can include any appropriate hardware and software for integrating with the data store 510 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 506 in the form of HTML, XML or another appropriate structured language in this example. The handling of all requests and responses, as well as the delivery of content between the client device 502 and the application server 508, can be handled by the Web server 506. It should be understood that the Web and application servers are not required and are merely example components, as structured code discussed herein can be executed on any appropriate device or host machine as discussed elsewhere herein.

The data store 510 can include several separate data tables, databases or other data storage mechanisms and media for storing data relating to a particular aspect. For example, the data store illustrated includes mechanisms for storing content (e.g., production data) 512 and user information 516, which can be used to serve content for the production side. The data store is also shown to include a mechanism for storing log or session data 514. It should be understood that there can be many other aspects that may need to be stored in the data store, such as page image information and access rights information, which can be stored in any of the above listed mechanisms as appropriate or in additional mechanisms in the data store 510. The data store 510 is operable, through logic associated therewith, to receive instructions from the application server 508 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 502. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 5. Thus, the depiction of the system 500 in FIG. 5 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing system, comprising:
at least one processor; and
memory including instructions that, when executed by the processor, cause the computing device to:
   determine a magnification level of a region for testing;
   generate, for the region at the determined magnification level, at least a first map using a first rendering engine and a second map using a second rendering engine, the first map and the second map each including a plurality of corresponding map labels;
   recognize, in each of the first map and the second map, text associated with each of the plurality of map labels using an optical character recognition (OCR) engine; and
   compare recognized text of each map label from the first map to each corresponding map label from the second map to identify a level of severity of at least one of an error or an inconsistency, the level of severity based at least in part on at least one of a type of the error or a type of the inconsistency.

2. The computing system of claim 1, wherein the instructions, when executed by the processor, further enable the computing device to:
   determine that the at least one of the error or the inconsistency exceeds a severity threshold; and
   notify an administrator of the at least one of error or inconsistency.

3. The computing system of claim 1, wherein the instructions, when executed by the processor, further enable the computing device to:
   provide the OCR engine with at least one of words, letters, or ideograms known to exist for the region.

4. The computing system of claim 1, wherein the instructions, when executed by the processor, further enable the computing device to:
   based at least in part on one or more languages associated with the region, identify the region as being associated with text of a first language and a second language, wherein recognizing the text associated with each of the plurality of map labels includes performing, using the OCR engine, text recognition of the region for each of the first language and the second language.

5. A computer-implemented method, comprising:
under the control of one or more computer systems configured with executable instructions,
   obtaining a first representation of a map from a first map rendering engine and a second representation of the map from a second map rendering engine;
   recognizing text associated with a plurality of map labels in each of the first representation and the second representation of the map; and
   comparing the recognized text of the first representation to corresponding recognized text of the second representation of the map to identify a level of severity of at least one inconsistency between the first map rendering engine and the second map rendering engine, the level of severity based at least in part on a type of the inconsistency.

6. The computer-implemented method of claim 5, further comprising:
   adjusting a color scheme of the plurality of map labels of at least one of the first representation or the second representation of the map; and
   detecting, while recognizing the text, irregular characters resulting from text of one or more of the plurality of map labels overlapping, the adjusted color scheme substantially blurring edges of overlapping text of the one or more of the plurality of map labels to produce the irregular characters.

7. The computer-implemented method of claim 5, wherein the first representation and the second representation are each obtained and compared from at least one of a different magnification level, a different rotation value, or a different viewing angle, using the first map rendering engine and the second map rendering engine.

8. The computer-implemented method of claim 5, wherein comparing the recognized text includes:
   identifying a map label of the plurality of map labels having at least two lines of text;
   normalizing text of the map label in each of the first representation and the second representation to a single line of text; and
   comparing the single line of normalized text from the map label of the first representation to a corresponding map label of the second representation to determine if the map label appears in each of the first representation and the second representation.

9. The computer-implemented method of claim 8, further comprising:
   analyzing a location of a line break between the at least two lines; identifying the location of the line break in the first representation being in a different location relative to the line break in the second representation; and determining at least one of a difference in line wrapping or text justification.

10. The computer-implemented method of claim 5, wherein the text is recognized using an optical character recognition (OCR) engine, and wherein the OCR engine is provided with at least one of words, letters, or ideograms known to be associated with the map for increasing recognition accuracy.

11. The computer-implemented method of claim 5, further comprising:

based at least in part on one or more languages associated with a region of the map, identifying the map being associated with text of a first language and a second language, wherein recognizing the text of the plurality of map labels includes performing, using an optical character recognition (OCR) engine, text recognition for each of the first language and the second language.

12. The computer-implemented method of claim 5, further comprising:

identifying a region on a map to test at least two map rendering engines; and determining a magnification level of the region for testing.

13. The computer-implemented method of claim 5, further comprising:

determining that the inconsistency exceeding a severity threshold; and notifying an administrator of the determined inconsistency.

14. A non-transitory computer-readable storage medium storing instructions that, when executed by at least one processor, cause a computing device to:

identify a region on a map to compare a first map rendering engine and a second map rendering engine;

obtain a first representation of the map from the first map rendering engine and a second representation of the map from the second map rendering engine;

recognize text associated with a plurality of map labels in each of the first representation and the second representation of the map; and compare the recognized text of the first representation to corresponding recognized text of the second representation of the map to identify a level of severity of at least one inconsistency between the first rendering engine and the second map rendering engine, the level of severity based at least in part on a type of the inconsistency.

15. The non-transitory computer-readable storage medium of claim 14, wherein the instructions that, when executed by the at least one processor, further cause the computing device to:

identify a region on a map to test at least two map rendering engines; and determine a magnification level of the region for testing.

16. The non-transitory computer-readable storage medium of claim 14, wherein the text is recognized using an optical character recognition (OCR) engine, and wherein the OCR engine is provided with at least one of words, letters, or ideograms known to be associated with the map for increasing recognition accuracy.

17. The non-transitory computer-readable storage medium of claim 14, wherein the first representation and the second representation are obtained and compared from at least one of a different magnification level, a different rotation value, or a different viewing angle, using the first map rendering engine and the second map rendering engine.

18. The non-transitory computer-readable storage medium of claim 14, wherein the instructions that, when executed by the at least one processor, further cause the computing device to:

based at least in part on one or more languages associated with a region of the map, identify the map being associated with text of a first language and a second language, wherein recognizing the text includes performing, using an optical character recognition (OCR) engine, text recognition for each of the first language and the second language.

19. The non-transitory computer-readable storage medium of claim 14, wherein the instructions that, when executed by the at least one processor, further cause the computing device to:

identify a map label of the plurality of map labels having at least two lines of text;

normalize text of the map label in each of the first representation and the second representation to a single line of text; and compare the single line of normalized text from the map label of the first representation to a corresponding map label of the second representation to determine whether the map label appears in each of the first and second representation.

20. The non-transitory computer-readable storage medium of claim 19, wherein the instructions that, when executed by the at least one processor, further cause the computing device to:

analyze a location of a line break between the at least two lines; and identify the location of the line break in the first representation being in a different location relative to the line break in the second representation; and determine at least one of a difference in line wrapping or text justification.

* * * * *